United States Patent
Creamer et al.

(10) Patent No.: US 7,215,959 B2
(45) Date of Patent: May 8, 2007

(54) CELLULAR TO 802.11 VOICE ROAMING UTILIZING SIP SIGNALING

(75) Inventors: Thomas E. Creamer, Boca Raton, FL (US); Neil A. Katz, Parkland, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 10/736,135

(22) Filed: Dec. 15, 2003

(65) Prior Publication Data

US 2005/0130650 A1   Jun. 16, 2005

(51) Int. Cl.
*H04Q 7/20* (2006.01)
*H04Q 7/00* (2006.01)

(52) U.S. Cl. ............... 455/436; 455/437; 455/439; 455/440; 370/331

(58) Field of Classification Search .......... 455/436, 455/437, 439, 440; 370/331
See application file for complete search history.

(56) References Cited

U.S. PATENT DOCUMENTS

| | | | | |
|---|---|---|---|---|
| 5,845,211 | A * | 12/1998 | Roach, Jr. ............ | 455/436 |
| 6,073,019 | A * | 6/2000 | Lowdon ............... | 455/436 |
| 6,122,511 | A * | 9/2000 | Ozluturk .............. | 455/437 |
| 6,308,066 | B1 * | 10/2001 | Ranta et al. .......... | 455/436 |
| 6,374,108 | B1 | 4/2002 | Jakobsen et al. | |
| 6,515,985 | B2 | 2/2003 | Shmulevich et al. | |
| 6,526,033 | B1 | 2/2003 | Wang et al. | |
| 6,725,044 | B2 * | 4/2004 | Verma et al. ......... | 455/444 |
| 2002/0049073 | A1 * | 4/2002 | Bell .................... | 455/552 |
| 2002/0147008 | A1 * | 10/2002 | Kallio ................. | 455/426 |
| 2003/0064761 | A1 * | 4/2003 | Nevermann .......... | 455/572 |
| 2003/0134636 | A1 * | 7/2003 | Sundar et al. ........ | 455/432 |
| 2004/0087307 | A1 * | 5/2004 | Ibe et al. ............. | 455/436 |
| 2004/0090937 | A1 * | 5/2004 | Chaskar et al. ...... | 370/331 |
| 2004/0192294 | A1 * | 9/2004 | Pan et al. ............ | 455/432.1 |
| 2004/0203788 | A1 * | 10/2004 | Fors et al. ........... | 455/439 |
| 2004/0249891 | A1 * | 12/2004 | Khartabil et al. ..... | 709/206 |
| 2005/0059400 | A1 * | 3/2005 | Jagadeesan et al. ... | 455/436 |
| 2005/0159153 | A1 * | 7/2005 | Mousseau et al. ..... | 455/432.1 |

FOREIGN PATENT DOCUMENTS

WO    WO 2003/061177    7/2003

OTHER PUBLICATIONS

Ye et al., The Mobile IP Handoff Between Hybrid Networks, IEEE Sep. 2002.

* cited by examiner

*Primary Examiner*—Lester G. Kincaid
*Assistant Examiner*—Marisol Figueroa
(74) *Attorney, Agent, or Firm*—Akerman Senterfitt

(57) ABSTRACT

A method of roaming between a cellular network and a wireless network can include receiving an invitation over the wireless network. The invitation can be sent from a mobile communications device engaged in a cellular call over a cellular voice channel. The method also can include authenticating the mobile communications device over the wireless network, sending an acknowledgement of the invitation to the mobile communications device over the wireless network, and initiating a handoff. The established cellular call can be switched from the cellular network to the wireless network.

45 Claims, 3 Drawing Sheets

CELLULAR TO 802.11 VOICE ROAMING UTILIZING SIP SIGNALING

BACKGROUND

1. Field of the Invention

The invention relates to the field of cellular communications and, more particularly, to the use of wireless networking in conjunction with cellular networks.

2. Description of the Related Art

Wireless networks are becoming increasingly prevalent with thousands of so called hotspots being deployed throughout the United States, Europe, and Asia. A hotspot refers to the coverage area surrounding a wireless access point within which a device can communicate wirelessly with the access point. The access point typically includes a wireless transceiver and is connected to a packet-switched communications network such as the Internet. As such, the access point provides network connectivity to those devices capable of establishing a wireless communications link with the access point. Mobile users can roam between multiple hot spots while maintaining connectivity with a communications network. Examples of hotspots or wireless networks are those built around one of the 802.11 wireless communications protocols.

Presently, such wireless networks function independently of cellular communications networks. These wireless networks, particularly 802.11 wireless networks, often function purely as data networks. That is, typically voice communications are not carried over such networks. In consequence, the voice capability of cellular networks has yet to be integrated with 802.11 wireless networks.

SUMMARY OF THE INVENTION

The present invention provides a method, system, and apparatus for allowing cellular device users to freely roam between a cellular network and a wireless network without dropping calls. One aspect of the present invention can include a method of roaming between a cellular network and a wireless network. The method can include receiving an invitation over the wireless network, wherein the invitation is sent from a mobile communications device engaged in a cellular call over a cellular voice channel, authenticating the mobile communications device over the wireless network, sending an acknowledgement of the invitation to the mobile communications device over the wireless network, and initiating a handoff. The established cellular call can be switched from the cellular network to the wireless network.

In one embodiment of the present invention, the wireless network can be configured according to any of the 802.11 communications protocols including, but not limited to, 802.11a, b, g, as well as other future derivatives. Still, it should be appreciated that the wireless network also can be configured according to 802.15.3 or emerging 802.16 wireless network protocols. Further, the invitation can be formatted using Session Initiation Protocol. The initiating step can include a gateway sending a communication to a mobile switching center. The communication can indicate that the mobile communications device has received a signal having a minimum amount of power from a wireless access point in the wireless network. The initiating step further can include setting up an Internet Protocol streaming session over the Internet and the wireless network to which the cellular call is switched. Accordingly, the cellular telephone call can be torn down.

Another aspect of the present invention can include a method of roaming between a cellular network and a wireless network. The method can include detecting the wireless network within a mobile communications device during an established cellular call conducted over a cellular voice channel, sending an invitation over the wireless network to a gateway interface linking the cellular network with the Internet, authenticating the mobile communications device, receiving an acknowledgement of the invitation, and initiating a handoff. The established cellular call can be switched from the cellular network to the wireless network.

In one embodiment of the present invention, the invitation is sent only if a signal detected from the wireless network is more powerful than a signal from the cellular network. The wireless network can be configured according to the 802.11, 802.15.3, or 802.16 communications protocols and the invite can be formatted using Session Initiation Protocol. Further, the initiating step can include attenuating the signal provided to the cellular network from the mobile communications device, thereby causing the cellular network to attempt a handoff of the cellular call.

The method also can include a gateway interface disposed between the cellular network and the Internet sending a signal to the cellular network indicating that a signal of adequate power has been detected by the mobile communications device from an access point in the wireless network. Notably, the acknowledgement can be sent from the gateway interface to the mobile communications device.

Another aspect of the present invention can include a method of roaming between a cellular network and a wireless network including detecting a signal from the wireless network during an established cellular call, comparing a measure of strength of the signal received from the wireless network with a measure of strength of a signal received from the cellular network, and initiating a handoff of the cellular call from the cellular network to the wireless network according to the comparing step. As noted, the wireless network can be configured according to the 802.11, 802.15.3, or 802.16 communications protocols.

Another aspect of the present invention can include a method of roaming between a cellular network and a wireless network including receiving a communication over the cellular network, wherein the communication is sent from a mobile communications device engaged in a wireless call over the wireless network, authenticating the mobile communications device over the cellular network, sending an acknowledgement of the communication to the mobile communications device over the cellular network, and initiating a handoff. The established wireless call can be switched from the wireless network to the cellular network.

In another embodiment of the present invention, the wireless network can be configured according to the 802.11, 802.15.3, or 802.16 communications protocols. The initiating step can include a mobile switching center sending a communication to a gateway. The communication can indicate that the mobile communications device has received a signal having a minimum amount of power from the cellular network. The initiating step also can include setting up a cellular voice link to which the wireless call is switched. The streaming session over which the call took place in the wireless network can be torn down.

Another aspect of the present invention can include a method of roaming between a cellular network and a wireless network including detecting the cellular network during an established call over the wireless network, establishing a communications link with a mobile data base station of the cellular network, such that a streaming session in the wireless network over which the call is conducted is terminated, and continuing the call over a voice channel of the cellular network.

Still another aspect of the present invention can include a method of roaming between a cellular network and a wireless data communications. The method can include detecting a signal from the cellular network during an established call conducted over the wireless network using a streaming session, comparing a measure of strength of the signal received from the cellular network with a measure of strength of a signal received over the wireless network, and initiating a handoff of the wireless call to the cellular network according to the comparing step.

Yet another aspect of the present invention can include a system for roaming between a cellular network and a wireless network. The system can include an access point configured to wirelessly communicate with mobile communications devices and facilitate communications over the Internet, a gateway configured as an interface between the Internet and the cellular network, and a mobile data base station configured to communicate with mobile communications devices over a voice channel of the cellular network. The system further can include a Session Initiation Protocol proxy server configured to perform call routing over the Internet and a mobile switching center configured to route cellular calls and link the mobile data base station with the gateway. The gateway and the mobile switching center can work cooperatively to switch calls between the cellular network and the wireless network via the Internet. The calls over the Internet can be managed by the Session Initiation Protocol proxy server.

In another embodiment, a call can be established over a voice channel of the cellular network and the gateway can receive an invite formatted using Session Initiation Protocol from a mobile communications device having detected a wireless data communication network. The gateway can be configured to authenticate a Session Initiation Protocol client operating in the mobile communications device. The gateway further can acknowledge the Session Initiation Protocol invite and initiate an Internet Protocol streaming session to the mobile communications device.

The mobile switching center can be configured to handoff a cellular call to another mobile data base station upon detecting reduced signal power from the mobile communications device. The gateway can signal the mobile switching center that a signal of sufficient power has been received via the wireless network. The mobile switching center can switch the call from the mobile data base station to the gateway. Notably, the gateway further can be configured to function as an interface to the Public Switched Telephone Network.

If a call has been established over the wireless network using a streaming session, the gateway can terminate the streaming session and transfer the call to the mobile switching center. The mobile switching center can route the call to the mobile data base station.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
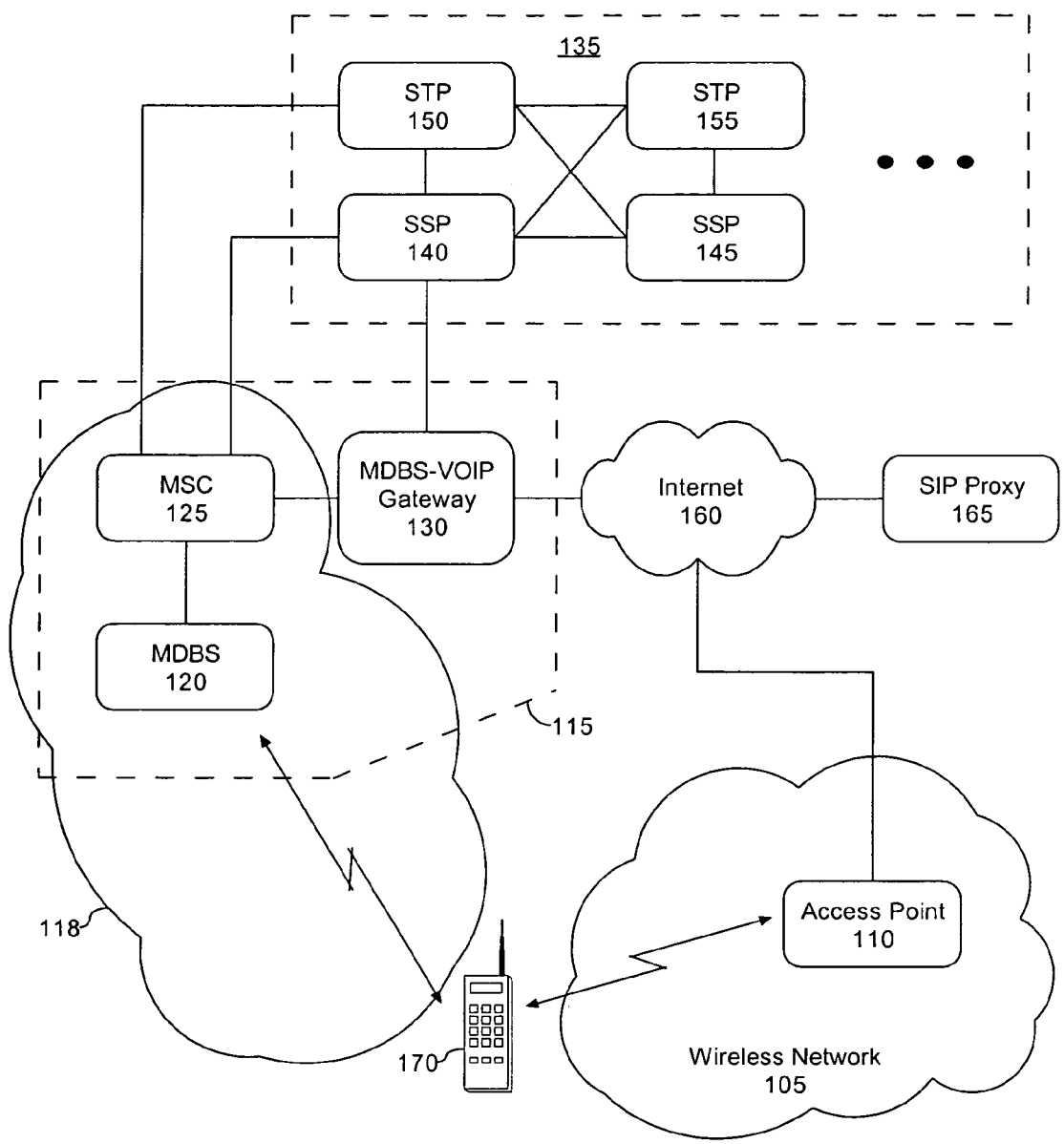
FIG. 1 is a schematic diagram illustrating a system for roaming between a cellular communications network and a wireless data communications network in accordance with the inventive arrangements disclosed herein.

FIG. 1 is a schematic diagram illustrating a system 100 for roaming between a cellular communications network (cellular network) and a wireless communications network (wireless network) in accordance with the inventive arrangements disclosed herein. As shown, the system 100 can include one or more wireless networks 105, a cellular network 115, a Public Switched Telephone Network (PSTN) 135, and a data network such as the Internet 160.

The wireless network 105 can be a wireless network that is compliant with any of the 802.11 communications protocols including, but not limited to 802,11a, b, g, as well as other future derivative. Still, the wireless network 105 can be configured according to the 802.15.3 or emerging 802.16 wireless communications protocols. As such, the wireless network 105 can include an access point 110. The access point 110 includes a wireless transceiver for communicating with one or more wireless communication devices, such as a mobile communications device 170, that are capable of communicating over an 802.11 wireless connection. For example, in addition to having a cellular and/or Personal Communications Service (PCS) transceiver, the mobile communications device 170, for example a telephone or any other suitably configured communications device, can include a transceiver configured to communicate over one of the 802.11 wireless communications protocols. The access point 110 further includes a wired connection to the Internet 160. Accordingly, the access point 110 is configured to serve as an interface between wireless devices communicating over an 802.11 communications protocol and packet-switched networks such as the Internet 160.

The cellular network 115 can be any of a variety of different wireless telephony networks including, but not limited to, conventional cellular telephony networks as well as PCS networks (referred to collectively or individually as a "cellular network"). As shown, the cellular network 115 has a coverage area 118. The cellular network 115 can include one or more Mobile Data Base Stations (MDBS) 120, a Mobile Switching Center (MSC) 125, as well as a Mobile Data Base Station—Voice-Over Internet Protocol (MDBS-VOIP) gateway 130.

The MDBS 120 can send cellular communications to and receive cellular communications from wireless device such as mobile communications device 170. For example, the MDBS 120 can include a tower (not shown) for wirelessly communicating with the mobile communications device 170. Tower can be communicatively linked with hardware and any necessary software within the MDBS 120 for converting data streams from the towers into valid signals and routing cellular-switched data calls to the PSTN 135 and/or to another cellular destination. The MDBS 120 manages and accesses the radio interface of the telephone 170 from the cellular network side. The MSC 125 includes hardware and any necessary software for connecting calls by switching the digital voice data packets from one network path to another. The MSC 125 effectively routes calls and also can provide additional information such as user registration, authentication, and location updating.

The MDBS-VOIP gateway 130 can include hardware and any necessary software to serve as an interface between the cellular network 115, the Internet 160, and the PSTN 135. Notably, while the MDBS-VOIP gateway 130 can serve as an interface to the Internet 160, it further can be used as an interface to other packet-switched networks (not shown) such as Wide Area Networks, Local Area Networks, an intranet, or the like. In any case, the MDBS-VOIP gateway 130 can format convert received data from the cellular network 115, the PSTN 135, and/or the Internet 160 for transmission over a different one of the networks. For example, the MDBS-VOIP gateway 130 can receive data formatted for use over the cellular network 115, data formatted for use over a circuit-switched network such as the PSTN 135, and packet-switched data for use over the Internet 160. The MDBS-VOIP gateway 130 can convert data from one format to another so that data can be freely exchanged between the cellular network 115, the PSTN 135, and the Internet 160.

It should be appreciated that while the MDBS-VOIP gateway 130 is depicted as being located in the cellular network 115, the MDBS-VOIP gateway 130 need not be so located. Rather, the MDBS-VOIP gateway 130 can be included as part of the PSTN 135, the Internet 160, or can be independently located with respect to each illustrated network.

The PSTN 135 can include Service Switching Points (SSP) 140 and 145, Signal Transfer Points (STP) 150 and 155, and one or more switching systems (not shown). The SSP's 140 and 145 are telephone switches interconnected by Switching System No. 7 (SS7) communication links. SSP's 140 and 145 perform call processing on calls that originate, tandem, or terminate at each respective site. The SSP's 145 and 150 can generate SS7 messages to transfer call-related information to other SSP's (not shown) or to query a Service Control Point (not shown) for routing instructions. The STP's 150 and 155 are switches that relay messages between network switches and databases. The STP's 150 and 155 can route SS7 messages to the correct outgoing signaling link based on SS7 message address fields.

A Session Initiation Protocol (SIP) proxy server 165 can be communicatively linked with a packet-switched network such as the Internet 160. The SIP proxy server 165 can be an application executing within a suitable information processing system having a communications link with the Internet 160. SIP is a standard protocol for initiating interactive user sessions that involve multimedia elements such as video, voice, chat, gaming, and virtual reality. SIP works in the Application layer of the Open Systems Interconnection (OSI) communications model to establish, modify, and terminate multimedia sessions or Internet telephony calls. The protocol also can be used to invite participants to unicast or multicast sessions that do not necessarily involve the initiator. Because SIP supports name mapping and redirection services, SIP allows users to initiate and receive communications and services from any location, and for networks to identify the users wherever the user may be located.

SIP is a request-response protocol, dealing with requests from clients and responses from servers. Participants are identified by SIP Uniform Resource Locators (URL's). Requests can be sent through any transport protocol, such as User Datagram Protocol (UDP), Stream Control Transmission Protocol (SCTP), or Transmission Control Protocol (TCP). SIP determines the end system to be used for the session, the communication media and media parameters, and the called party's desire to engage in the communication. Once these are assured, SIP establishes call parameters at either end of the communication, and handles call transfer and termination.

As noted, the mobile communications device 170 can be configured to communicate over both the cellular network 115 and the wireless network 105. As the mobile communications device 170 can include transceivers for communicating over both cellular networks 115 and wireless networks 105, the mobile communications device 170 can be configured to measure the power of signals received from each network and vary the transmission strength of signals sent to each respective network. In addition, the mobile communications device 170 also can include a SIP user agent executing therein. The SIP user agent can encode and decode SIP formatted messages which are exchanged over the wireless network 105.

Figure 2:
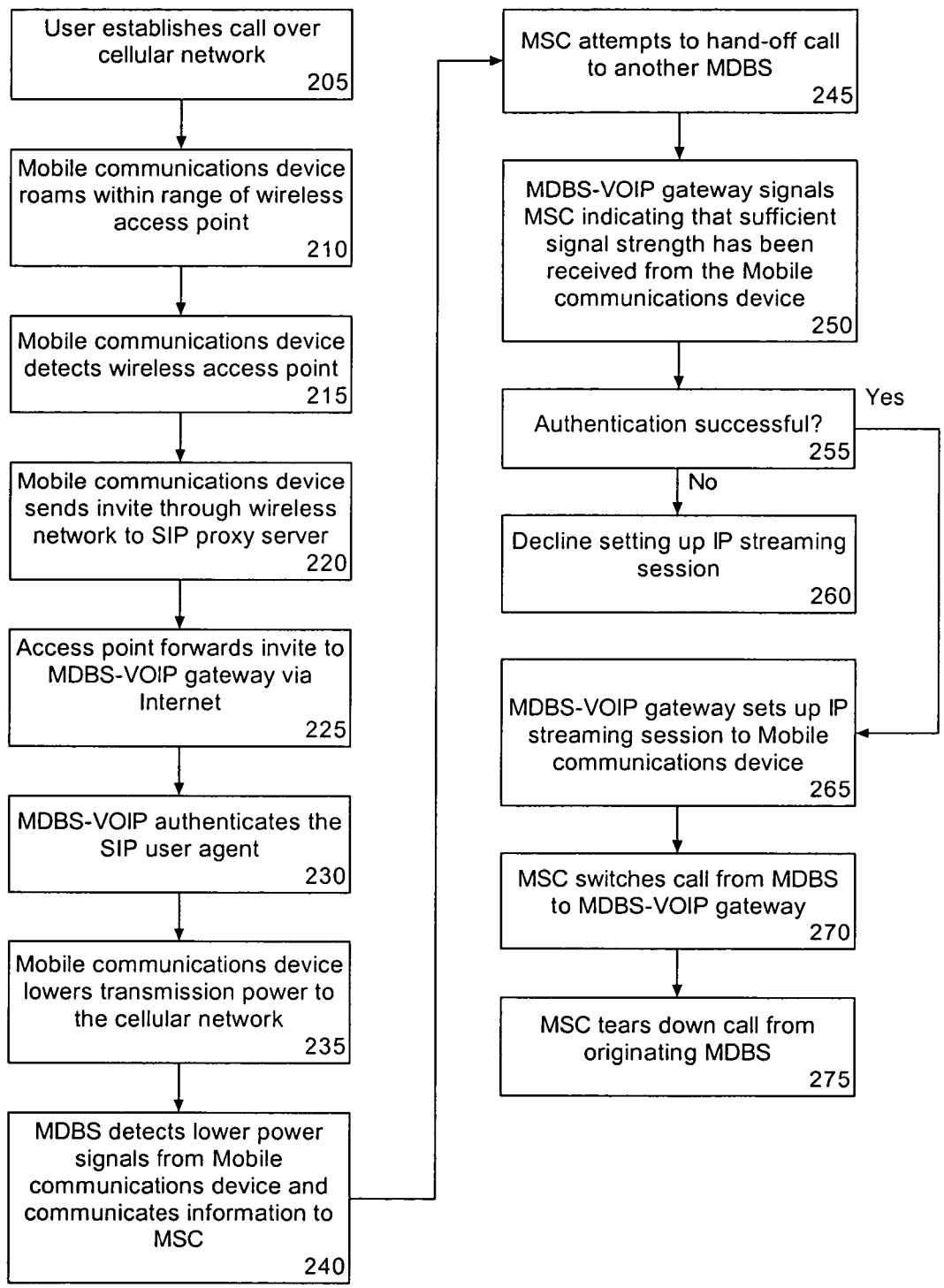
FIG. 2 is a flow chart illustrating a method of roaming between a cellular communications network and a wireless data communications network in accordance with one aspect of the present invention.

FIG. 2 is a flow chart illustrating a method 200 of roaming between a cellular network and a wireless network in accordance with one aspect of the present invention. The method 200 can begin in a state where a user has a mobile communications device, such as a telephone, that is configured to communicate over cellular networks and a wireless network such as one configured according to one of the 802.11 communications protocols. Further, the mobile communications device can include a SIP user agent executing therein. The method can begin in step 205 where a user activates the mobile communications device to establish a call over a cellular network. Once the call is established, in step 210, the user and communications device can roam within range of an 802.11 compliant wireless access point.

In step 215, the mobile communications device can detect the access point and in step 220 send an invite. The invite can be a SIP invite and that is sent wirelessly to the access point. In step 225, the access point forwards the invite to the MDBS-VOIP gateway via the Internet or another packet-switched network. In step 230, the MDBS-VOIP gateway authenticates the SIP user agent executing within the mobile communications device. For example, the MDBS-VOIP gateway can instruct the SIP proxy server to authenticate the SIP user agent. The authentication information then can be passed back to the MDBS-VOIP gateway.

In step 235, the mobile communications device can lower the transmission power used to transmit to the cellular network. In one embodiment of the present invention, the mobile communications device can be configured to compare the strength or power of detected signals from both the cellular network and the wireless network. Accordingly, if the signal strength detected from the wireless network exceeds the signal strength detected from the cellular network, the mobile communications device can be configured to lower the power used to transmit to the cellular network, or otherwise attenuate signals being sent to the cellular network. If not, the mobile communications device need not transmit signals at reduced power to the cellular network, or otherwise attenuate signals sent to the cellular network. As such, the call can continue over the cellular network.

In step 240, the MDBS detects and measures the weakened signals being transmitted from the mobile communications device. The MDBS can communicate this information to the MSC. In step 245, having received information regarding the weakened signals received from the mobile communications device in the MDBS, the MSC attempts to hand-off the call to another MDBS. It should be appreciated that the mobile communications device can be configured or programmed to reduce transmission power to the cellular network or attenuate signals sent to the cellular network to a predetermined level such that, when the weakened signals from the mobile communications device are detected by the cellular network, a hand-off condition in the MSC is triggered. That is, the MSC can initiate a hand-off when the power of signals received from the mobile communications device are measured to be less than a threshold level. The MSC also can be configured to notify the MDBS-VOIP gateway of any detected hand-off conditions.

In step 250, the MDBS-VOIP gateway signals the MSC using a standard communications protocol, for example Standard IS-41, that the MDBS-VOIP gateway has received a signal having a minimum power or strength from the mobile communications device. For instance, the access point can detect the strength of the signal received from the mobile communications device and provide that information to the MDBS-VOIP gateway.

In step 255, the MDBS-VOIP gateway can determine whether the authentication of the SIP user agent in the mobile communications device was successful. If not, the method can proceed to step 260 where the MDBS-VOIP gateway declines to set up an Internet Protocol (IP) streaming session with the mobile communications device. In that case, the method can end and the call can remain with the cellular network. If the SIP user agent is successfully authenticated, the method can proceed to step 265.

In step 265, the MDBS-VOIP gateway sets up an IP streaming session between the mobile communications device and the MDBS-VOIP gateway via the access point using standard streaming protocols such as Real Time Protocol (RTP). In step 270, the MSC switches the call from the MDBS to the MDBS-VOIP gateway. After completion of step 270, the leg or portion of the call involving the mobile communications device and user is conducted over the 802.11 wireless network. Depending upon the location of the other call participant, other legs of the call can be conducted over the Internet as an IP-based call, the PSTN as a conventional call, the cellular network as a cellular call, or another wireless network conforming with one of the 802.11 communications protocols. In step 275, the MSC can tear down the call originating from the MDBS.

Figure 3:
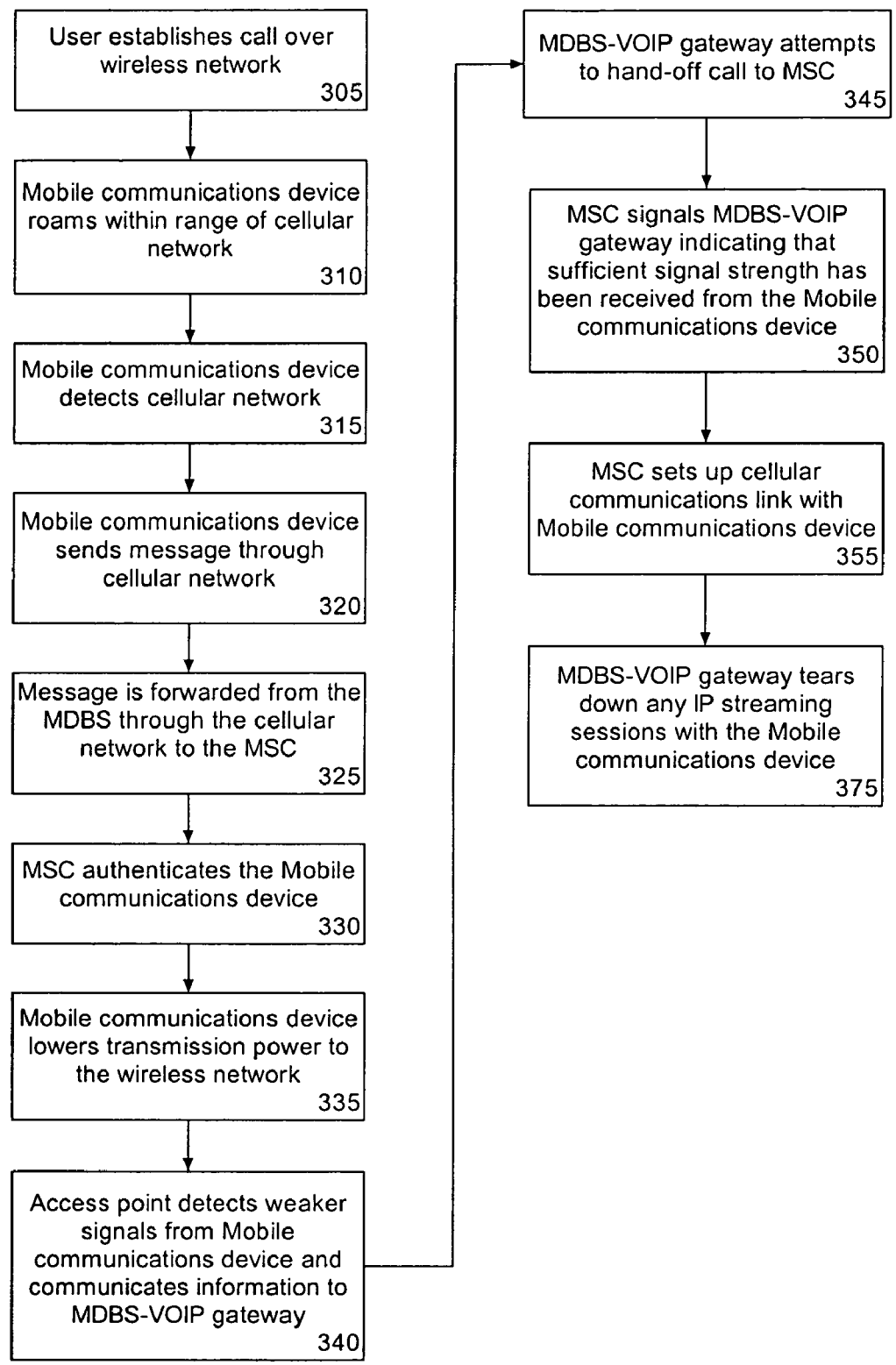
FIG. 3 is a flow chart illustrating a method of roaming between a cellular communications network and a wireless data communications network in accordance with another aspect of the present invention.

FIG. 3 is a flow chart illustrating a method 300 of roaming between a cellular network and a wireless network in accordance with another aspect of the present invention. The method can begin in step 305 where at least a portion of a call has been established over an 802.11 wireless network using a mobile communications device configured as described herein. In step 310, the mobile communications device roams into a cellular network.

In step 315, the mobile communications device can detect the cellular network. In step 320, the mobile communications device can send a message to the MDBS in the cellular network, which can forward the message to the MSC in step 325. In step 330, the MSC authenticates the mobile communications device within the cellular network.

In step 335, the mobile communications device can lower the transmission power used to transmit to the wireless network, or otherwise attenuate signals sent to the wireless network. As noted, the mobile communications device can be configured to compare the strength or power of detected signals from both the cellular network and the wireless network. If the signal strength detected from the cellular network exceeds the signal strength detected from the wireless network, the mobile communications device can be configured to lower the power used to transmit to the wireless network, or otherwise attenuate signals sent to the wireless network. If not, the mobile communications device can maintain the transmission power to the wireless network so that signals transmitted to the wireless network are not attenuated. In that case, the established call can continue over the wireless network.

In step 340, the access node in the wireless network detects weaker signals from the mobile communications device and communicates this information to the MDBS-VOIP gateway. In step 345, having received information regarding the attenuated signals from the mobile communications device, using standard communications protocols, the MDBS-VOIP gateway signals the MSC in an attempt to hand-off the call to a MDBS. As previously discussed, the mobile communications device can be configured or programmed to reduce transmission power used by the wireless network transceiver to a predetermined power level such that a hand-off condition is triggered in the MDBS-VOIP gateway. That is, the MDBS-VOIP gateway can initiate a hand-off when the power of signals received from the mobile communications device are measured to be less than a threshold level.

In step 350, the MSC signals the MDBS-VOIP gateway that an MDBS has received a signal measured to have at least a minimum power from the mobile communications device such that communications can be handled over the cellular network. For example, a tower can receive signals from the mobile communications device such that the MDBS can measure the power of the received signals and provide that information to the MSC.

In step 355, the MSC can set up a voice channel between a MDBS and the mobile communications device. Accordingly, the leg of the call that was conducted over the 802.11 wireless network is transferred to the cellular network. As noted with reference to FIG. 2, depending upon the location of the other call participant, other legs of the call can be conducted over the Internet as an IP-based call, the PSTN as a conventional call, the cellular network as a cellular call, or a wireless network conforming with one of the 802.11 communications protocols. In step 360, once the call has been switched from the MDBS-VOIP gateway to the MSC, any IP streaming sessions with the mobile communications device that were conducted over the wireless network can be torn down.

The methods described herein with reference to FIGS. 2 and 3 have been provided for purposes of illustration only. As such, it should be appreciated that particular steps can be performed in varying order without departing from the spirit or essential attributes of the present invention.

The present invention provides a solution that allows mobile communications device users to roam freely between cellular networks and 802.11 wireless networks. The embodiments disclosed herein support both voice and data communications between cellular and wireless networks. As such, cellular users can continue to access both voice and data services whether in proximity to a cellular network or a wireless network as described herein.

The present invention can be realized in hardware, software, or a combination of hardware and software. Aspects of the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

Aspects of the present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without department from the spirit or essential attributes thereof. Accordingly, reference should be made to the following claims, rather than to the foregoing specification, as indicating the scope of the invention.

What is claimed is:

1. A method of roaming between a cellular network and a wireless network comprising the steps of:
   receiving an invitation over the wireless network, wherein the invitation is sent from a mobile communications device engaged in a cellular call over a cellular voice channel;
   authenticating the mobile communications device over the wireless network;
   sending an acknowledgement of the invitation to the mobile communications device over the wireless network;
   comparing the strength of detected signals from both the cellular network and wireless network; and
   initiating a handoff based on the comparison, wherein the established cellular call is switched from the cellular network to the wireless network, and wherein the mobile communications device determines based upon the comparison to effect the handoff and operates to attenuate a signal transmitted from the mobile communications device to the cellular network thereby causing the cellular network to effect the handoff.

2. The method of claim 1, wherein the wireless network is configured according to at least one of the 802.11, 802.15.3, or 802.16 communications protocols.

3. The method of claim 1, wherein the invitation is formatted using Session Initiation Protocol.

4. The method of claim 1, wherein said initiating step comprises the step of a gateway sending a communication to a mobile switching center indicating that the mobile communications device has received a signal having a minimum amount of power from a wireless access point in the wireless network.

5. The method of claim 4, wherein said initiating step further comprises the step of setting up an Internet Protocol streaming session over the Internet and the wireless network to which the cellular call is switched.

6. The method of claim 5, further comprising the step of tearing down the cellular call.

7. A method of roaming between a cellular network and a wireless network comprising the steps of:
   during an established cellular call using a cellular voice channel, detecting the wireless network within a mobile communications device;
   sending an invitation over the wireless network to a gateway interface linking the cellular network with the Internet;
   authenticating the mobile communications device;
   receiving an acknowledgement of the invitation; and
   initiating a handoff wherein the established cellular call is switched from the cellular network to the wireless network, the mobile communications device deciding when to initiate the handoff and acting to attenuate a signal provided to the cellular network from the mobile communications device, thereby causing the cellular network to handoff the cellular call.

8. The method of claim 7, wherein the invitation is sent only if a signal detected from the wireless network is more powerful than a signal from the cellular network.

9. The method of claim 7, wherein the wireless network is configured according to at least one of the 802.11, 802.15.3, or 802.16 communications protocols and the invite is formatted using Session Initiation Protocol.

10. The method of claim 7, wherein a gateway interface between the cellular network and the Internet sends a signal to the cellular network indicating that the mobile communications device has received a signal of adequate power from an access point in the wireless network.

11. The method of claim 7, wherein the acknowledgement is sent from a gateway interface between the cellular network and the Internet.

12. A method of roaming between a cellular network and a wireless network comprising the steps of:
   during an established cellular call, detecting a signal from the wireless network;
   comparing a measure of strength of the signal received from the wireless network with a measure of strength of a signal received from the cellular network; and
   initiating a handoff of the cellular call from the cellular network to the wireless network according to said comparing step, wherein the mobile communications device determines when to initiate the handoff and operates to attenuate signals transmitted from the mobile communications device to the cellular network and thereby causing the cellular network to effect the handoff.

13. The method of claim 12, wherein the wireless network is configured according to at least one of the 802.11, 802.15.3, or 802.16 communications protocols.

14. A method of roaming between a cellular network and a wireless network comprising the steps of:
   receiving a communication over the cellular network, wherein the communication is sent from a mobile communications device engaged in a wireless call over the wireless network;
   authenticating the mobile communications device over the cellular network;
   sending an acknowledgement of the communication to the mobile communications device over the cellular network; and
   initiating a handoff, wherein the established wireless call is switched from the wireless network to the cellular network, and wherein the mobile communications device determines when to initiate the handoff and operates to attenuate signals transmitted from the mobile communications device to the wireless network.

15. The method of claim 14, wherein the wireless network is configured according to at least one of the 802.11, 802.15.3, or 802.16 communications protocols.

16. The method of claim 14, wherein said initiating step comprises the step of a mobile switching center sending a communication to a gateway indicating that the mobile communications device has received a signal having a minimum amount of power from the cellular network.

17. The method of claim 16, wherein said initiating step further comprises the step of setting up a cellular voice link to which the wireless call is switched.

18. The method of claim 17, further comprising the step of tearing down a streaming session over which the wireless call took place in the wireless network.

19. A method of roaming between a cellular network and a wireless network comprising the steps of:
   during an established call conducted over the wireless network using a streaming session, detecting a signal from the cellular network;
   comparing a measure of strength of the signal received from the cellular network with a measure of strength of a signal received from the wireless network; and
   initiating a handoff of the call from the wireless network to the cellular network based on said comparing step, wherein the mobile communications device determines when to initiate the handoff and operates to attenuate signals transmitted from the mobile communications device to the wireless network and thereby causing the handoff to occur.

20. The method of claim 19, wherein the wireless network is configured according to at least one of the 802.11, 802.15.3, or 802.16 communications protocols.

21. A system for roaming between a cellular network and a wireless network comprising:
   means for receiving an invitation over the wireless network, wherein the invitation is sent from a mobile communications device engaged in a cellular call over a cellular voice channel;
   means for authenticating the mobile communications device over the wireless network;
   means for sending an acknowledgement of the invitation to the mobile communications device over the wireless network;
   means for comparing the strength of detected signals from both the cellular network and wireless network; and
   means within said mobile communications device for initiating a handoff based upon the comparison, wherein the established cellular call is switched from the cellular network to the wireless network, wherein said means for initiating cause the mobile communications device to attenuate signals transmitted from the mobile communications device to the cellular network so as to cause the cellular network to effect the handoff.

22. A system for roaming between a cellular network and a wireless network comprising:
   means for detecting the wireless network within a mobile communications device during an established cellular call using a cellular voice channel;
   means for sending an invitation over the wireless network to a gateway interface linking the cellular network with the Internet;
   means for authenticating the mobile communications device;
   means for receiving an acknowledgement of the invitation; and
   means within said mobile communications device for initiating a handoff wherein the established cellular call is switched from the cellular network to the wireless network, said means for initiating causing the mobile communications to attenuate a signal provided to the cellular network from the mobile communications device, thereby causing the cellular network to handoff the cellular call.

23. A system for roaming between a cellular network and a wireless network comprising:
   means for detecting a signal from the wireless network during an established cellular call;
   means for comparing a measure of strength of the signal received from the wireless network with a measure of strength of a signal received from the cellular network; and
   means within said mobile communications device for initiating a handoff of the cellular call from the cellular network to the wireless network according to a comparison made by said means for comparing, said means for initiating causing said mobile communications device to attenuate a signal transmitted from said mobile communications device to said cellular network.

24. A system for roaming between a cellular network and a wireless network comprising:
   means for receiving a communication over the cellular network, wherein the communication is sent from a mobile communications device engaged in a wireless call over the wireless network;
   means for authenticating the mobile communications device over the cellular data network;
   means for sending an acknowledgement of the communication to the mobile communications device over the cellular network; and
   means within said mobile communications device for initiating a handoff, wherein the established wireless call is switched from the wireless network to the cellular network, and wherein said means for initiating causing said mobile communications device to attenuate a signal transmitted from said mobile communications device to said wireless network.

25. A system for roaming between a cellular network and a wireless network comprising:
   means for detecting a signal from the cellular network during an established call conducted over the wireless network using a streaming session;
   means for comparing a measure of strength of the signal received from the cellular network with a measure of strength of a signal received from the wireless network; and
   means within a mobile communications device for initiating a handoff of the wireless call from the wireless network to the cellular network according to a comparison made by said means for comparing, said means for initiating causing said mobile communications device to attenuate signals transmitted from said mobile communications device to the wireless network.

26. A machine readable storage, having stored thereon a computer program having a plurality of code sections executable by a machine for causing the machine to perform the steps of:
   receiving an invitation over a wireless network, wherein the invitation is sent from a mobile communications device engaged in a cellular call over a cellular voice channel in a cellular network;
   authenticating the mobile communications device over the wireless network;
   sending an acknowledgement of the invitation to the mobile communications device over the wireless network
   comparing the strength of detected signals from both the cellular network and wireless network; and
   initiating a handoff based upon the comparison, wherein the established cellular call is switched from the cellular network to the wireless network, and wherein initiating the handoff comprises causing the mobile communications device operating to attenuate a signal transmitted from the mobile communications device to the cellular network and thereby causing the cellular network to effect the handoff.

27. The machine readable storage of claim 26, wherein the wireless network is configured according to at least one of the 802.11, 802.15.3, or 802.16 communications protocols.

28. The machine readable storage of claim 26, wherein the invitation is formatted using Session Initiation Protocol.

29. The machine readable storage of claim 26, wherein said initiating step comprises the step of a gateway sending a communication to a mobile switching center indicating that the mobile communications device has received a signal having a minimum amount of power from a wireless access point in the wireless network.

30. The machine readable storage of claim 29, wherein said initiating step further comprises the step of setting up an Internet Protocol streaming session over the Internet and the wireless network to which the cellular call is switched.

31. The machine readable storage of claim 30, further comprising the step of tearing down the cellular telephone call.

32. A machine readable storage, having stored thereon a computer program having a plurality of code sections executable by a machine for causing the machine to perform the steps of:
  during an established cellular call using a cellular voice channel over a cellular network, detecting a wireless network within a mobile communications device;
  sending an invitation over the wireless network to a gateway interface linking the cellular network with the Internet;
  authenticating the mobile communications device;
  receiving an acknowledgement of the invitation; and
  initiating a handoff wherein the established cellular call is switched from the cellular network to the wireless network, the initiating comprising the mobile communications device operating to attenuate a signal provided to the cellular network from the mobile communications device, thereby causing the cellular network to handoff the cellular call.

33. The machine readable storage of claim 32, wherein said invitation is sent only if a signal detected from the wireless network is more powerful than a signal from the cellular network.

34. The machine readable storage of claim 32, wherein the wireless network is configured according to at least one of the 802.11, 802.15.3, or 802.16 communications protocols and the invite is formatted using Session Initiation Protocol.

35. The machine readable storage of claim 32, wherein a gateway interface between the cellular network and the Internet sends a signal to the cellular network indicating that a signal of adequate power has been detected by the mobile communications device from an access point in the wireless network.

36. The machine readable storage of claim 32, wherein the acknowledgement is sent from a gateway interface between the cellular network and the Internet.

37. A machine readable storage, having stored thereon a computer program having a plurality of code sections executable by a machine for causing the machine to perform the steps of:
  during an established cellular call over a cellular network, detecting a signal from a wireless network;
  comparing a measure of strength of the signal received from the wireless network with a measure of strength of a signal received from the cellular network; and
  initiating a handoff of the cellular call from the cellular network to the wireless network according to said comparing step, wherein said initiating step comprises the mobile communications device operating in response to the comparison to attenuate signals transmitted from the mobile communications device to the cellular network and thereby causing the cellular network to effect the handoff.

38. The machine readable storage of claim 37, wherein the wireless network is configured according to at least one of the 802.11, 802.15.3, or 802.16 communications protocols.

39. A machine readable storage, having stored thereon a computer program having a plurality of code sections executable by a machine for causing the machine to perform the steps of:
  receiving a communication over a cellular network, wherein the communication is sent from a mobile communications device engaged in a wireless call over a wireless network;
  authenticating the mobile communications device over the cellular network;
  sending an acknowledgement of the communication to the mobile communications device over the cellular network; and
  initiating a handoff, wherein the established wireless call is switched from the wireless network to the cellular network, and wherein initiating the handoff comprises causing the mobile communications device operating in response to the acknowledgment to attenuate signals transmitted from the mobile communications device to the wireless network.

40. The machine readable storage of claim 39, wherein the wireless network is configured according to at least one of the 802.11, 802.15.3, or 802.16 communications protocols.

41. The machine readable storage of claim 39, wherein said initiating step comprises the step of a mobile switching center sending a communication to a gateway indicating that the mobile communications device has received a signal having a minimum amount of power from the cellular network.

42. The machine readable storage of claim 41, wherein said initiating step further comprises the step of setting up a cellular voice link to which the wireless call is switched.

43. The machine readable storage of claim 42, further comprising the step of tearing down a streaming session over which the call took place in the wireless network.

44. A machine readable storage, having stored thereon a computer program having a plurality of code sections executable by a machine for causing the machine to perform the steps of:
  during an established call conducted over a wireless network using a streaming session, detecting a signal from a cellular network;
  comparing a measure of strength of the signal received from the cellular network with a measure of strength of a signal received from the wireless network; and
  initiating a handoff of the call from the wireless network to the cellular network based on said comparing step, wherein initiating the handoff comprises the mobile communications device operating in response to the comparison to attenuate signals transmitted from the mobile communications device to the wireless network and thereby causing the handoff to occur.

45. The machine readable storage of claim 44, wherein the wireless network is configured according to at least one of the 802.11, 802.15.3, or 802.16 communications protocols.

* * * * *